US011959444B2

(12) United States Patent
Wiebrecht et al.

(10) Patent No.: US 11,959,444 B2
(45) Date of Patent: Apr. 16, 2024

(54) METHOD AND APPARATUS FOR VENTILATING A FUEL INLET CONNECTION FOR A FUEL INJECTOR

(71) Applicant: Caterpillar Inc., Peoria, IL (US)

(72) Inventors: Eric Donald Wiebrecht, Germantown Hills, IL (US); William J. Barnes, Rapid City, SD (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/895,564

(22) Filed: Aug. 25, 2022

(65) Prior Publication Data

US 2024/0068433 A1 Feb. 29, 2024

(51) Int. Cl.

*F02M 55/00* (2006.01)
*F02M 55/02* (2006.01)
*F02M 61/14* (2006.01)
*F02M 51/00* (2006.01)

(52) U.S. Cl.

CPC ........ *F02M 55/007* (2013.01); *F02M 55/002* (2013.01); *F02M 55/004* (2013.01); *F02M 55/02* (2013.01); *F02M 61/14* (2013.01); *F02M 51/005* (2013.01); *F02M 2200/27* (2013.01)

(58) Field of Classification Search

CPC ............... F02M 51/005; F02M 55/002; F02M 55/004–005; F02M 55/007; F02M 55/02; F02M 61/14; F02M 69/462; F02M 2200/27; H01H 2009/048

USPC .......................................................... 277/315

See application file for complete search history.

(56) References Cited

U.S. PATENT DOCUMENTS 3,924,583 A 12/1975 Jardin
4,898,208 A 2/1990 Nelson
5,819,708 A 10/1998 Buratti et al.
7,115,036 B2 * 10/2006 Masuda .................. F16D 3/227 464/17
7,475,674 B2 1/2009 Marksteiner et al.
8,997,715 B2 4/2015 Worthington et al.
9,803,603 B2 * 10/2017 Ganser ................. F02M 55/008

FOREIGN PATENT DOCUMENTS

GB 2149453 A 6/1985
GB 2216184 B 1/1992
JP H0517274 U * 3/1993 ............. F02M 55/02
JP 2009008144 A * 1/2009
RU 2108500 C1 * 4/1998
WO WO-2010039244 A1 * 4/2010 ............... F16J 3/046
WO 2017186523 A1 11/2017

* cited by examiner

*Primary Examiner* — Hung Q Nguyen
*Assistant Examiner* — Mark L. Greene

(57) ABSTRACT

A boot includes an annular body that defines a thru-bore with a thru-bore diameter, and a bore axis. The boot further defines an overall axial length, an exterior, a first axial end, a second axial end, and an aperture that radially extends from the thru-bore to the exterior.

16 Claims, 15 Drawing Sheets

METHOD AND APPARATUS FOR VENTILATING A FUEL INLET CONNECTION FOR A FUEL INJECTOR

TECHNICAL FIELD

The present disclosure relates generally to fuel injectors that are used in internal combustion engines that may have fuel leaks. More specifically, the present disclosure relates to boot that may be placed over the fuel inlet of the fuel injector for containing a possible fuel leak.

BACKGROUND

Internal combustion engines are routinely used in various industries to power machines and equipment. Examples of industries using such machines and equipment include marine, earth moving, construction, mining, marine, locomotive and agriculture industries, etc. In certain markets and market segments (e.g., marine engines), there has been a desire to switch to non-carbon based fuels such as methanol to reduce the emission of greenhouse gases, etc. However, there is a risk that the inlet connection between the fuel injector and its fuel source may leak. This is undesirable especially for methanol. Also, regulations require continuous monitoring or detection of leaks of methanol for safety purposes. For those purposes, custom made fuel injectors specifically designed for methanol applications are available. However, these fuel injectors are expensive.

U.S. Pat. No. 5,819,708 (the '708 patent) discloses a number of sleeves fitted about the conduits of a supply circuit that supplies to fuel to the fuel injectors of an engine. Each sleeve is tubular, has a bellows type main body, and two opposite end portions, and an outlet fitting extending from one of the end portions. The sleeves are fitted to the conduits by fitting the end portions in a fluid tight manner to fittings at opposite ends of the conduits. The outlet fitting of each sleeve is then connected to a catch header by a respective connecting line, which connects the inner cavity of the main body to the catch header to enable any fuel leakage from the conduits to the flow into the catch header.

However, the '708 patent does not address the detection of leaking fuel, or the accommodation of the electrical connector of the fuel injector, etc. Also, a solution that is readily available and inexpensive is desirable.

SUMMARY OF THE DISCLOSURE

A fuel injector, a cylinder head, and a fuel supply interface according to an embodiment of the present disclosure may comprise a fuel injector having an at least partially annular body defining a longitudinal axis, and a radial direction. The fuel injector may include a fuel inlet, an injection outlet, and an electrical connector. The interface may further comprise a double walled conduit that is attached to the fuel injector, and a boot that is disposed about the at least partially annular body of the fuel injector, and the double wall A boot according to an embodiment of the present disclosure may comprise an annular body defining a thru-bore with a bore diameter, and a bore axis, an overall length, an exterior, a first axial end, a second axial end, and an aperture extending radially from the thru-bore to the exterior.

A conduit joint according to an embodiment of the present disclosure may comprise an integral double walled conduit defining an outer circumferential surface with a groove disposed near a free end of the double walled conduit, a radially inner annular channel, and a radially innermost fluid supply channel.

DETAILED DESCRIPTION

Figure 1:
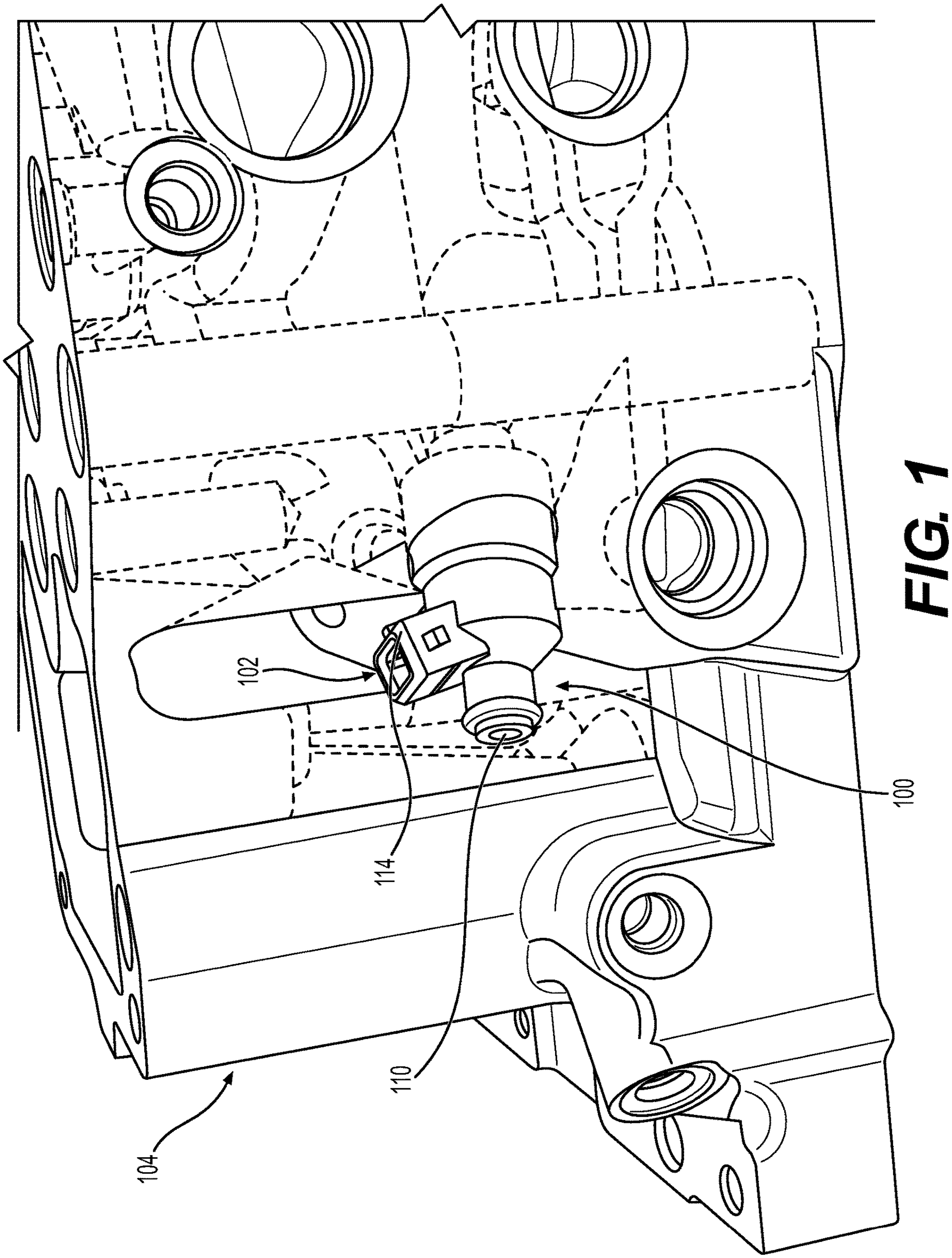
FIG. 1 is a perspective view of fuel injector such as a EV14 common rail fuel injector connected to a cylinder head of a marine engine.
Figure 2:
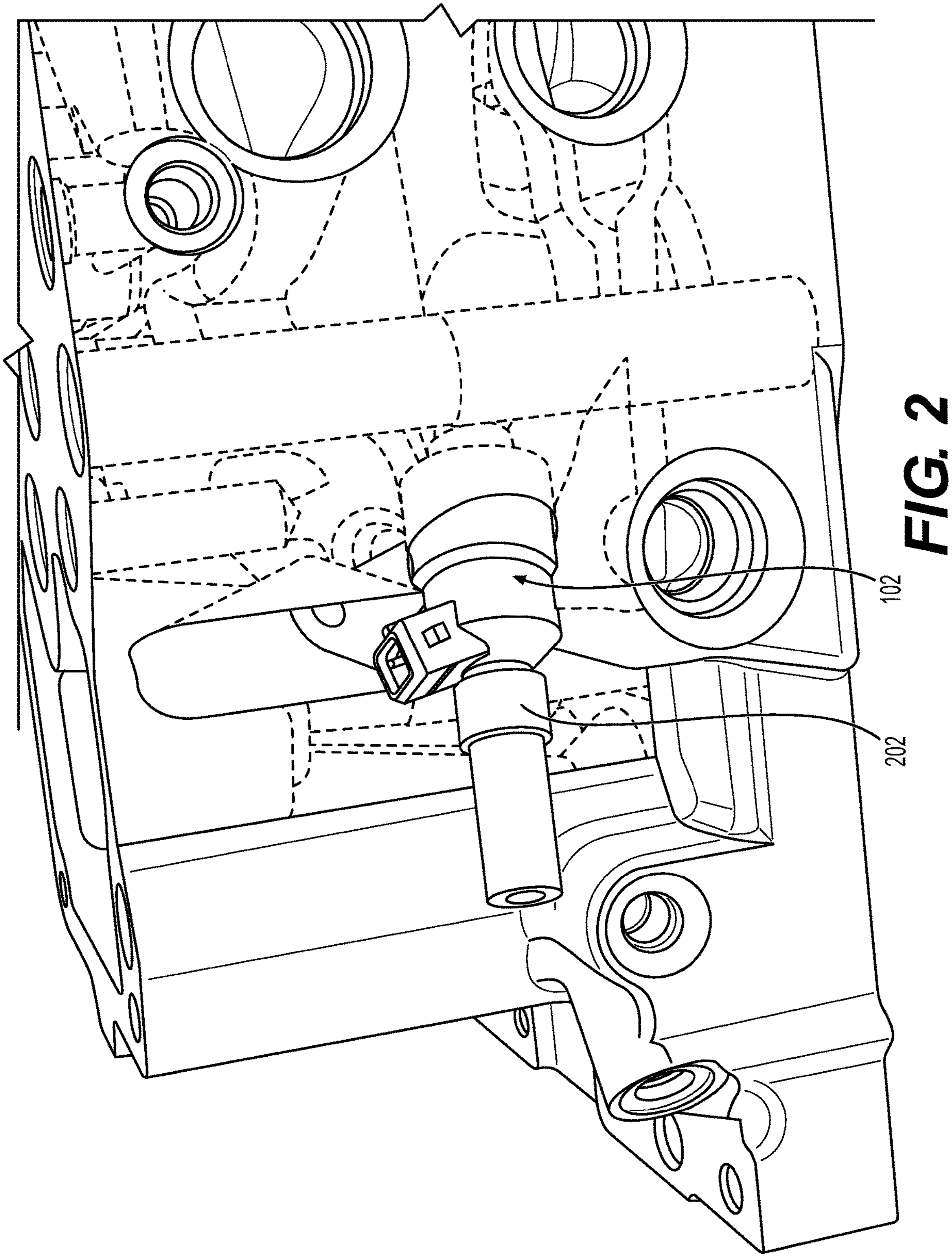
FIG. 2 depicts the fuel injector and engine of FIG. 1 with a fuel line attached to the fuel inlet of the fuel injector.
Figure 3:
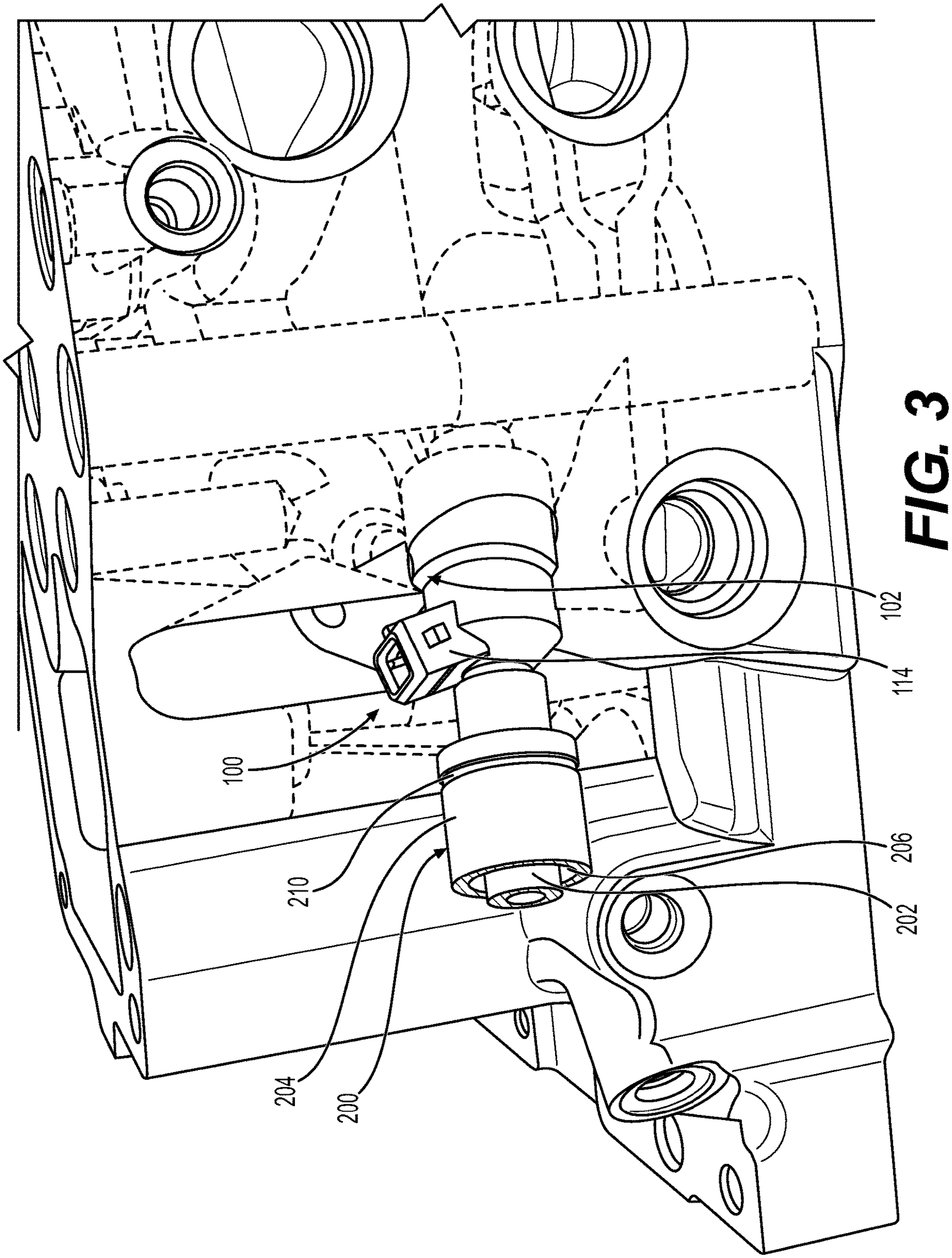
FIG. 3 illustrates the fuel injector and engine of FIG. 2 with an outer conduit that provides an air channel about the fuel line. In combination, the fuel line and the outer conduit form a double walled channel or conduit that may be integral with each other so that movement of one also moves the other. This may not be the case in other embodiments of the present disclosure.
Figure 4:
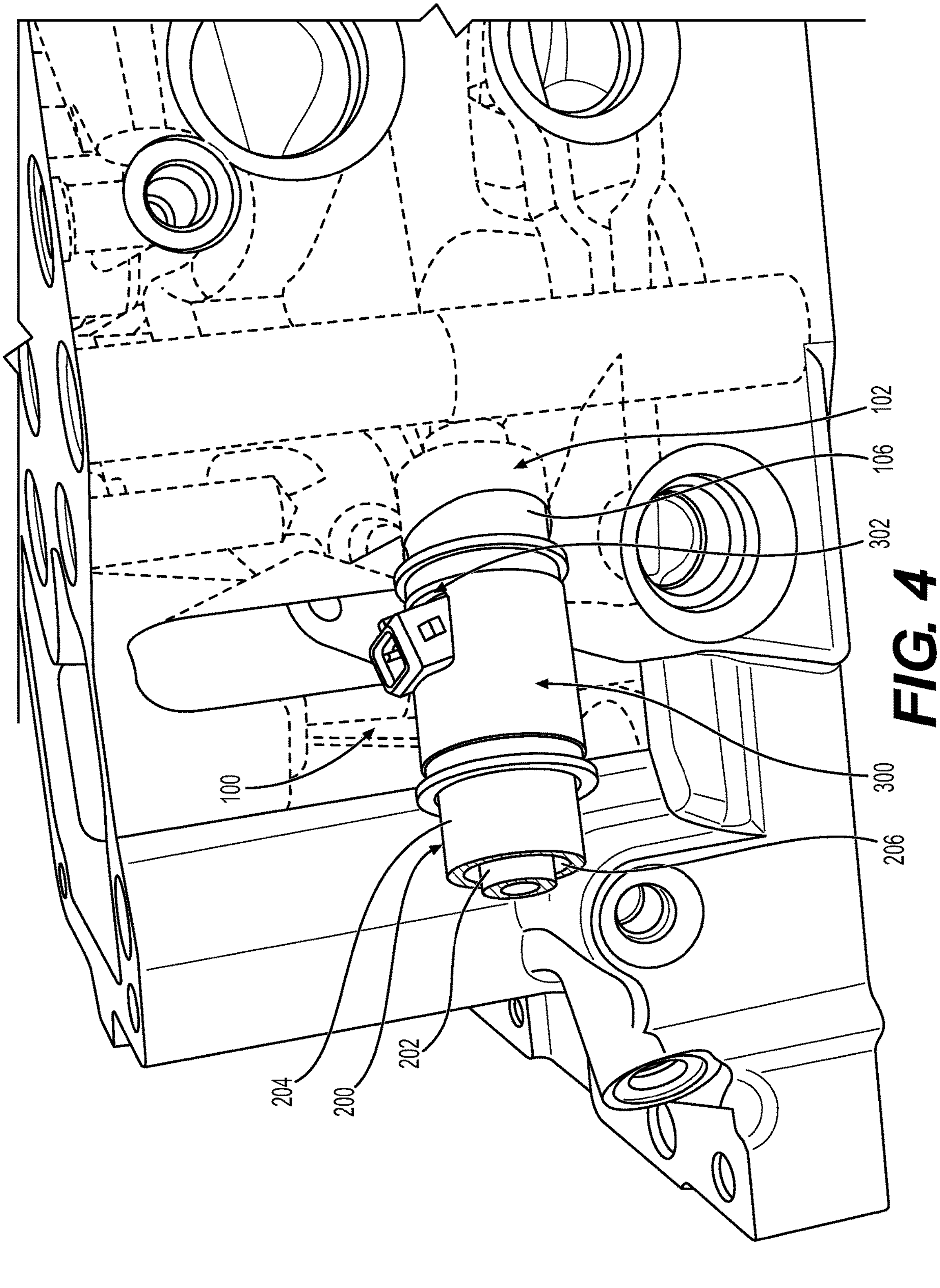
FIG. 4 shows the fuel injector of FIG. 3 with a boot disposed about its exterior for containing leakage of fuel according to an embodiment of the present disclosure.
Figure 5:
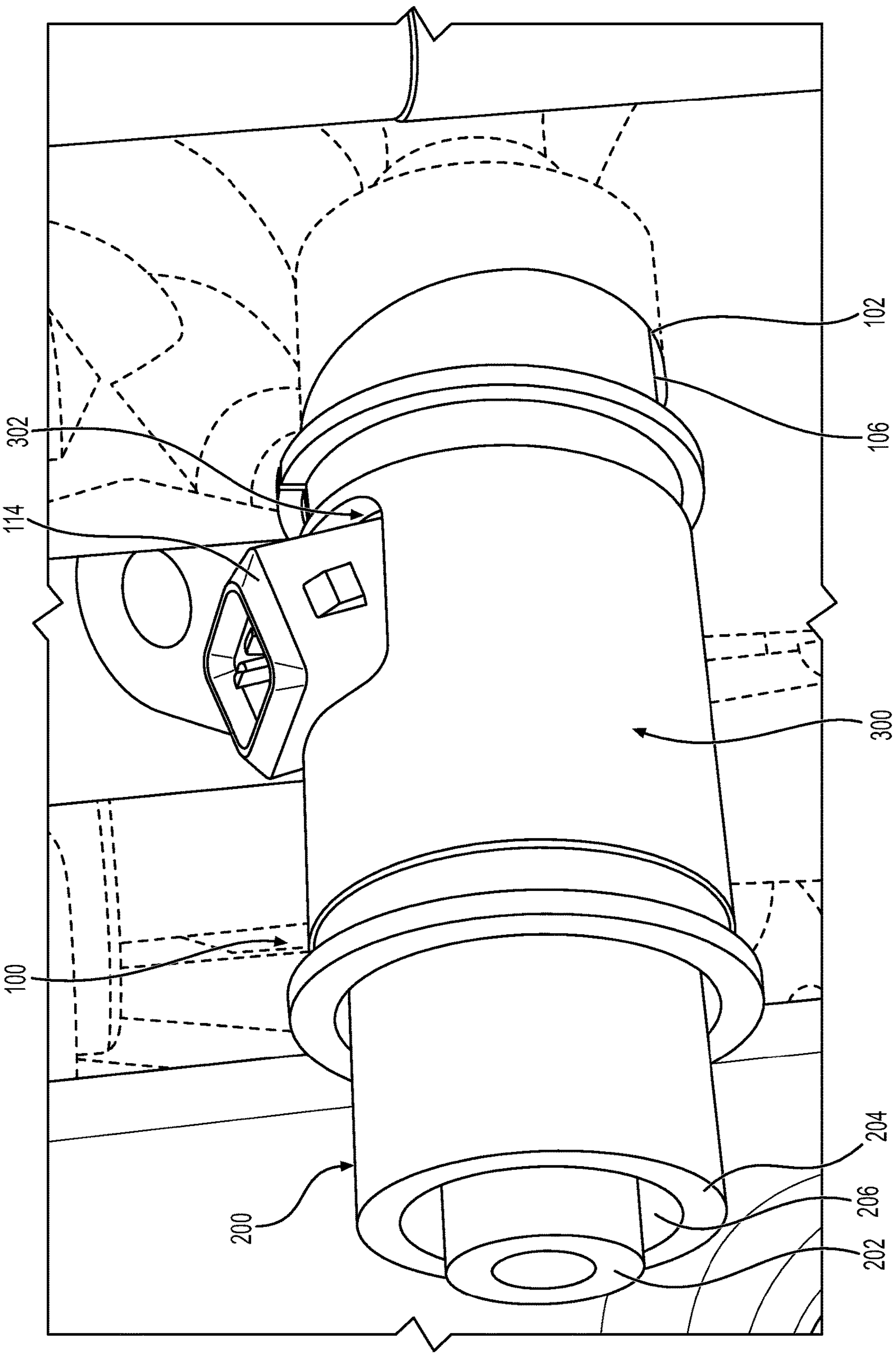
FIG. 5 is enlarged view of the boot and fuel injector of FIG. 4.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or a prime indicator such as 100', 100"

etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

Various embodiments of a boot (may also be referred to as a sleeve) with an aperture for receiving the electrical connector of a fuel injector that is connected to a fuel supply and a fuel leakage monitoring system will now be discussed. The fuel injector may be a an EV14 fuel injector that is readily available and inexpensive. Other types and models of fuel injectors (mechanical, hydraulic, etc.) may be employed in other embodiment in other embodiments of the present disclosure.

Figure 7:
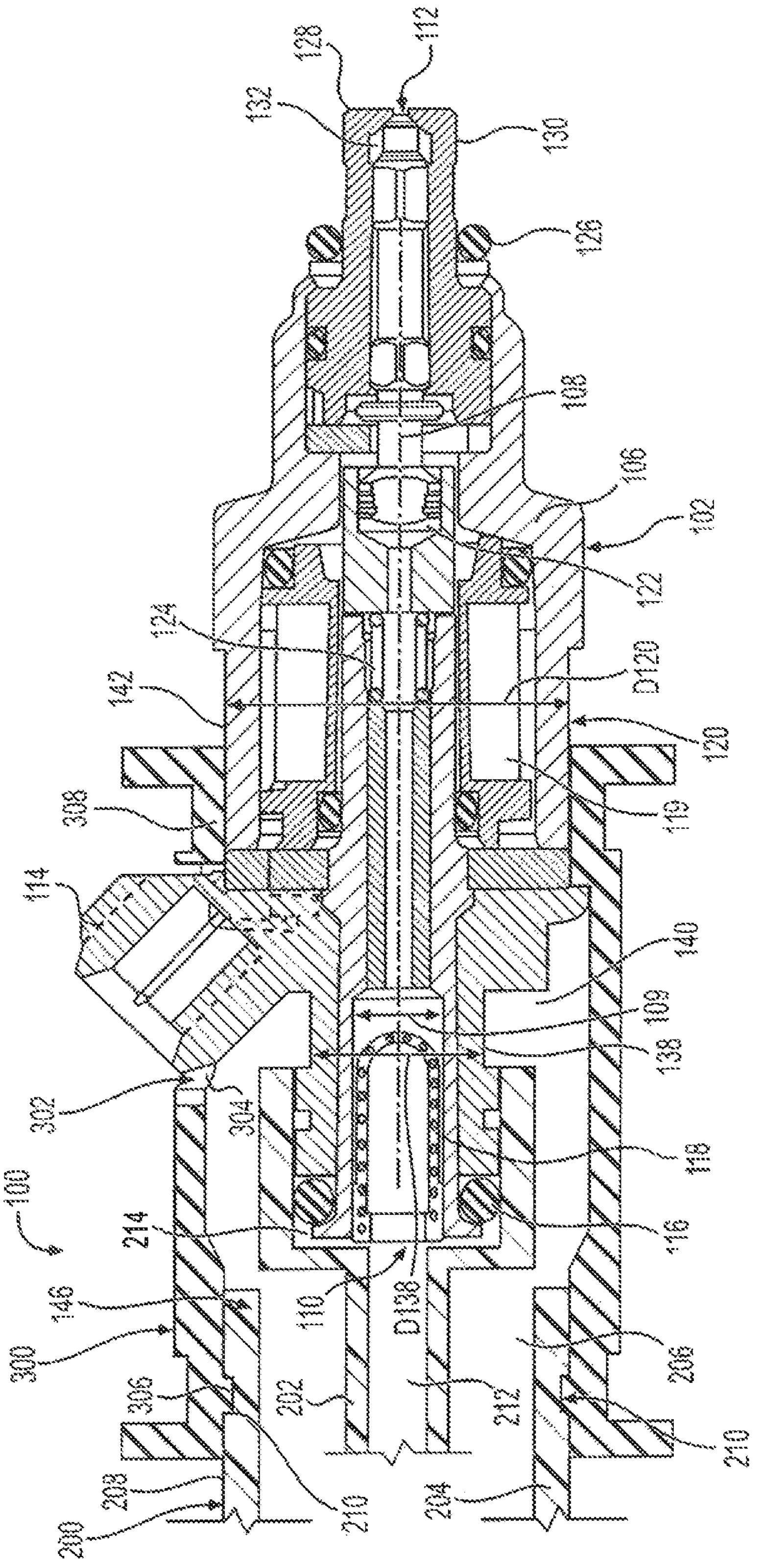
FIG. 7 is a sectioned side view of a fuel injector and a boot that are similar or identical to those of FIG. 6 taken along a radially extending plane passing through the centerline or longitudinal axis of the fuel injector.

Starting with FIGS. 1 and 7, a fuel injector 102, a cylinder head 104, and a fuel supply interface 100 is shown. The fuel injector 102 typically has an at least partially annular body 106 (e.g., conical, cylindrical, elliptical, etc.) defining a longitudinal axis 108 as well as a radial direction 109, and may include a fuel inlet 110, an injection outlet 112, and an electrical connector 114. Other annular configurations for the fuel injector are possible including polygonal, etc.

As already mentioned, this fuel injector 102 further comprises a rail O-ring 116 (or other type of seal) that is disposed radially and axially proximate to the fuel inlet 110, a fuel filter 118 that is disposed axially between the fuel inlet 110 and the injection outlet 112, a coil 119 that is disposed radially inwardly from a first diameter portion 120, and that is in electrical communication with the electrical connector 114. An armature 122 may be disposed axially between the coil 119 and the injection outlet 112.

The fuel injector 102 may further comprise a spring 124 (e.g., a compression spring) that is disposed radially inwardly of the coil 119 and axially contacts the armature 122, a cylinder head O-ring 126 that is disposed radially and axially proximate to the injection outlet 112 that is defined by an injection nozzle member 128. A shutoff stem 130 may be disposed radially inwardly from the cylinder head O-ring 126. The shutoff stem 130 may be disposed in a bore 132 of the injection nozzle member 128 that may be configured to shut off the injection outlet 112 by impinging on the shutoff surface 134 of the injection outlet.

In operation, the spring provides force to the armature, which contacts the shut off stem, forcing the shut off stem to close the fuel injector. When the electronic control unit (ECU), or other similar apparatus, determines that it is time for the fuel injector to open to inject fuel, it sends current to the electrical connector via a current supply line (not shown), which in turn energizes the coil that electromagnetically moves the armature against the spring force as well as the shut off stem away from the injection outlet. So, fuel is injected into the combustion chamber at high pressure. Once the coil is deenergized, the shut off stem will close due to the spring force.

Again, it should be noted that this type of fuel injector is only one example of the type of fuel injector that may be employed. Mechanically activated, hydraulically activated, as well as other types of common rail fuel injectors, etc. may be employed in other embodiments of the present disclosure.

Referring now to FIG. 4 thru 7, a doubled walled conduit 200 may be attached to the fuel injector 102, as well as a boot 300 that may be disposed about the at least partially annular body 106 of the fuel injector 102 and the doubled wall conduit 200. The doubled walled conduit 200 is so called since it includes an inner fuel supply line 202 that is connected to the fuel inlet 110 of the fuel injector 102, and an outer conduit 204 that defines an annular air channel 206 between the inner fuel supply line 202, and the outer conduit 204. The conduit may be made from stainless steel.

The boot 300 may be disposed about the outer conduit 204, and may define an aperture 302 through which the electrical connector 114 of the fuel injector 102 may extend. An air gap 304 may be defined between the perimeter of the aperture 302 of the boot 300, and the electrical connector 114 of the fuel injector that is in fluid communication with the annular air channel 206. As a result of this construction, air may be drawn into the annular air channel through the air gap so that any fuel leakage is directed away from the aperture toward fuel sensor(s) that may alert the operator if a leak develops, and/or shut down the engine and/or the fuel pump if desired or necessary.

As best seen in FIGS. 1 and 7, the at least partially annular body 106 of the fuel injector 102 may include a first diameter portion 120 that is disposed axially between the electrical connector 114 and the injection outlet 112, and a second diameter portion 138 that that is disposed axially between the fuel inlet 110, and the electrical connector 114. More particularly, they may have different diameters. As shown in FIG. 7, the first diameter D120 is greater than the second diameter D138, providing an air void 140 that connect the annular air channel 206 to the air gap 304. Other configurations are possible in other embodiments of the present disclosure.

As understood with reference to FIGS. 7 and 9, a conduit joint 146 or connection between the double walled conduit 200 and the boot 300 will now be discussed. The double walled conduit 200 may have an outer circumferential surface 208 with a groove 210 disposed axially near its free end 210, a radially inner annular channel (e.g., the annular air channel 206), and a radially innermost fluid supply channel 212. The boot 300 may include a first inner rib 306 that may be disposed in the groove 210 that helps to prevent axial movement of the boot once it has been slid into this position. Now, the boot 300 may also be disposed radially about the outer circumferential surface 208 of integral double walled conduit 200.

The joint 146 may include a counterbore 214 that receives the rail O-ring 126 in a fluid tight manner. Though not shown, a similar joint or counterbore may be provided between the cylinder head and the cylinder head O-ring 126 or other seal (e.g., a quad ring, etc.).

Similarly, the boot 300 may also have a second inner rib 308 that may fit within a matching shaped groove 142 of the fuel injector 102. This too may help prevent axial movement of the boot. The first inner rib is spaced away from a free end of the boot, while the second inner rib extends to the other free end. Other configurations of these features are possible in other embodiments of the present disclosure. Also, these ribs and grooves may be omitted in other embodiments such as when the boot provides enough elastic or other shrinking force to prevent its movement, etc.

Figure 8:
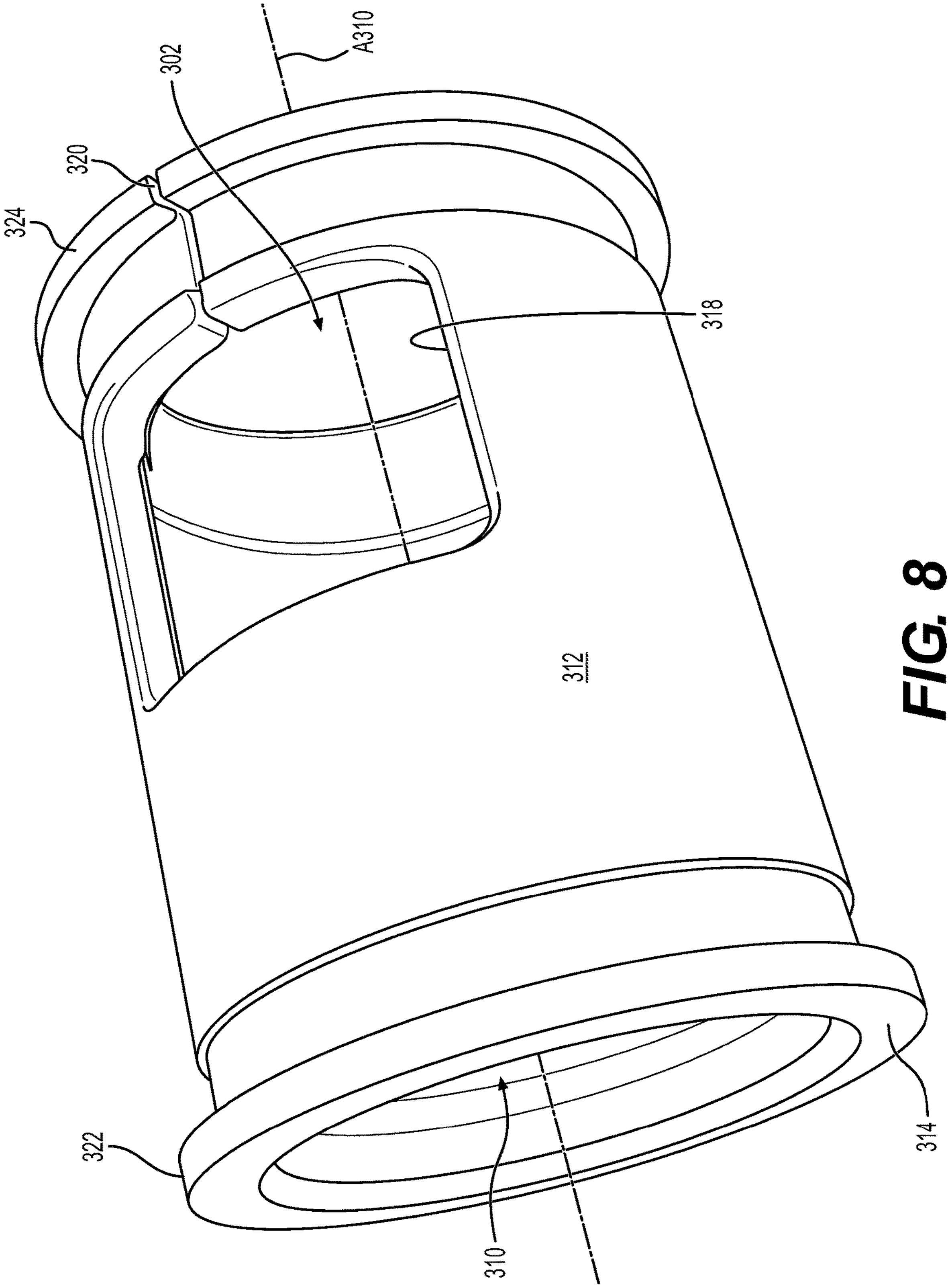
FIG. 8 is a perspective view of the boot of FIG. 6 shown in isolation. The aperture for allowing the electrical connector of fuel injector to pass through the boot is shown. Also, a slit is shown that allows the boot to slide axially around the electrical connector if desired.
Figure 9:
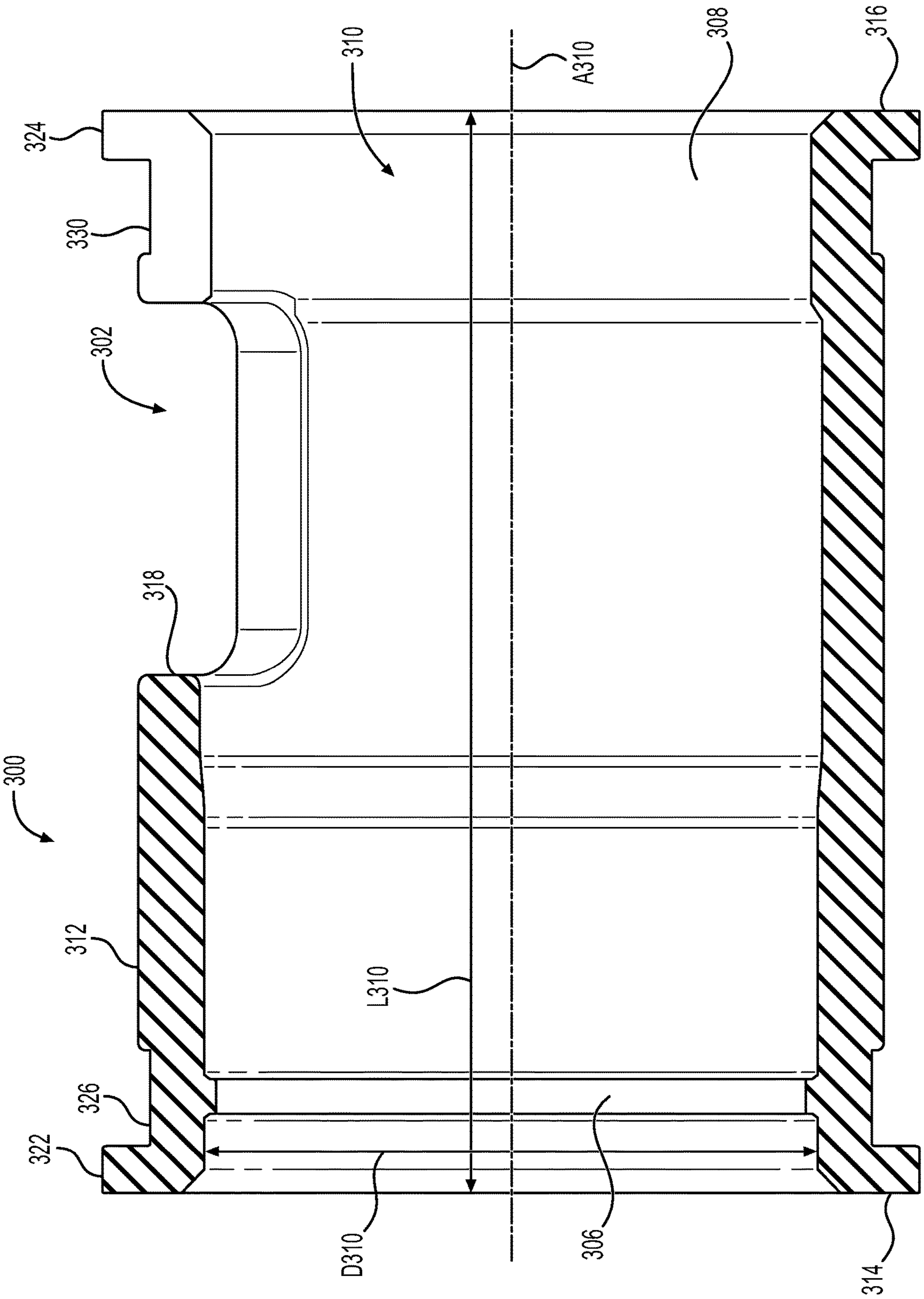
FIG. 9 is a sectional view of the boot of FIG. 8 taken along a plane passing through the centerline or longitudinal axis of the boot.
Figure 10:
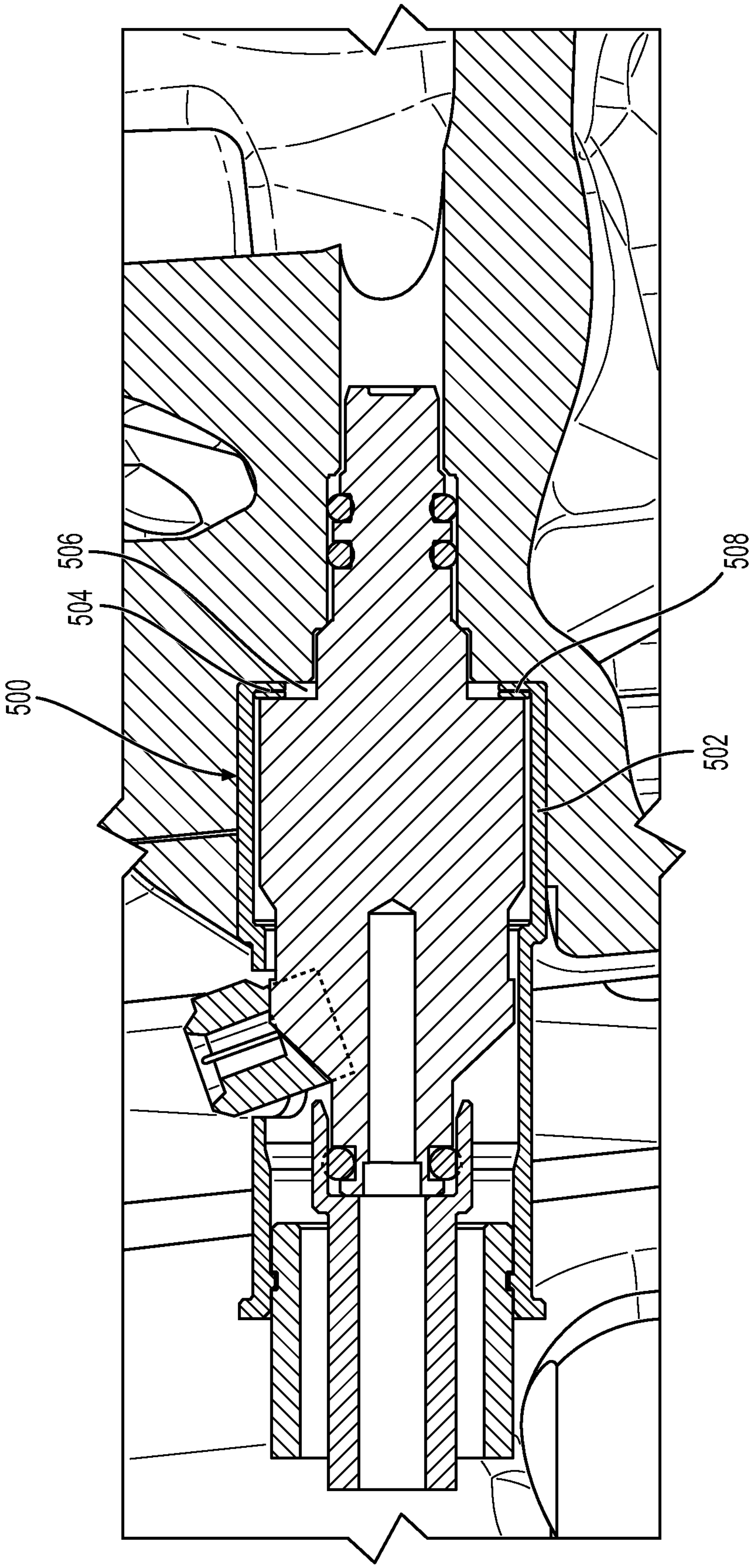
FIG. 10 is a sectional view similar to that of FIG. 7 except that another embodiment of a boot is shown where the front of the boot includes a shoulder that extends radially near the front of the fuel injector. A slit extending from the electrical connector receiving aperture is also omitted.
Figure 11:
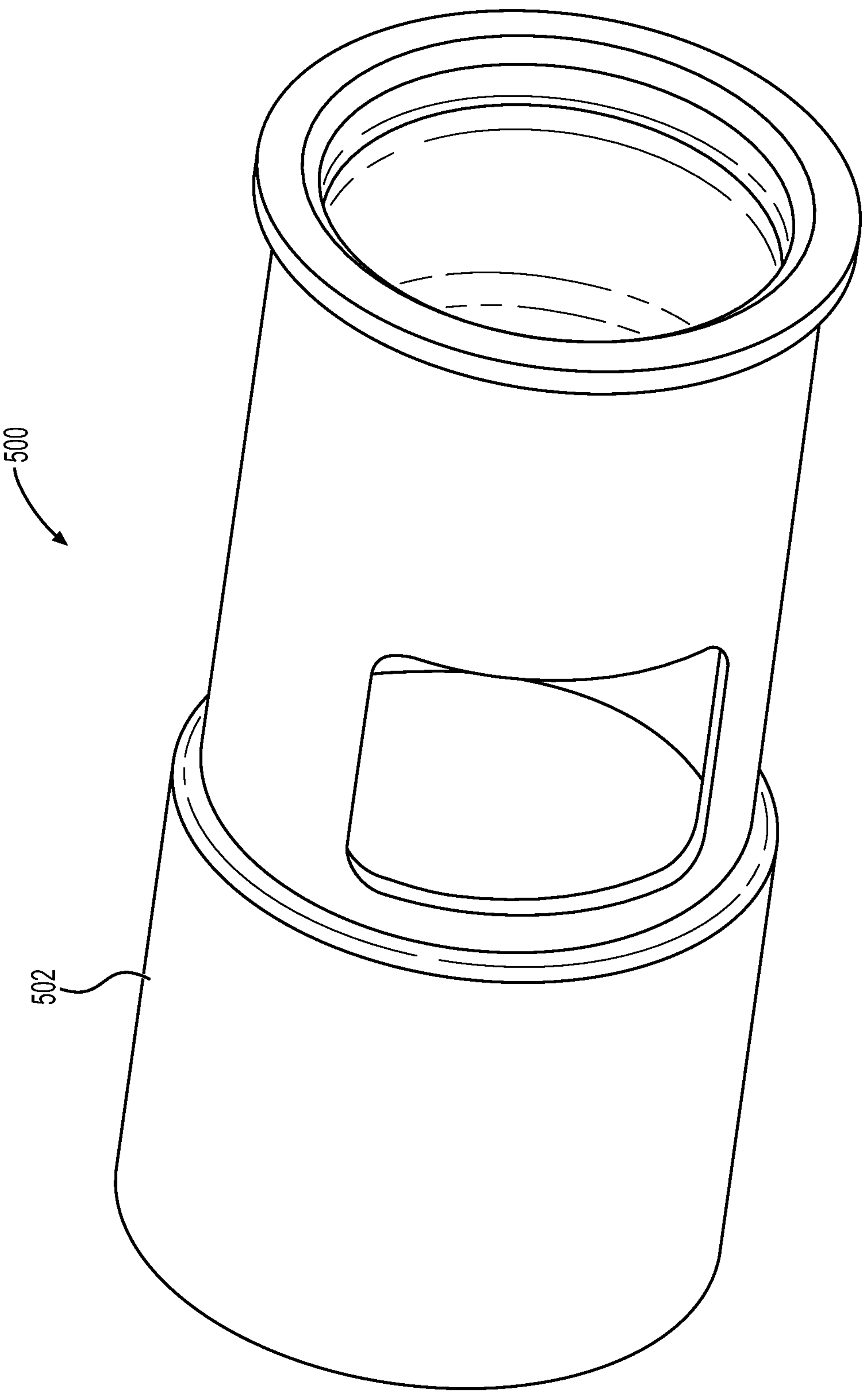
FIG. 11 is a perspective view of the boot of FIG. 10 shown in isolation.
Figure 12:
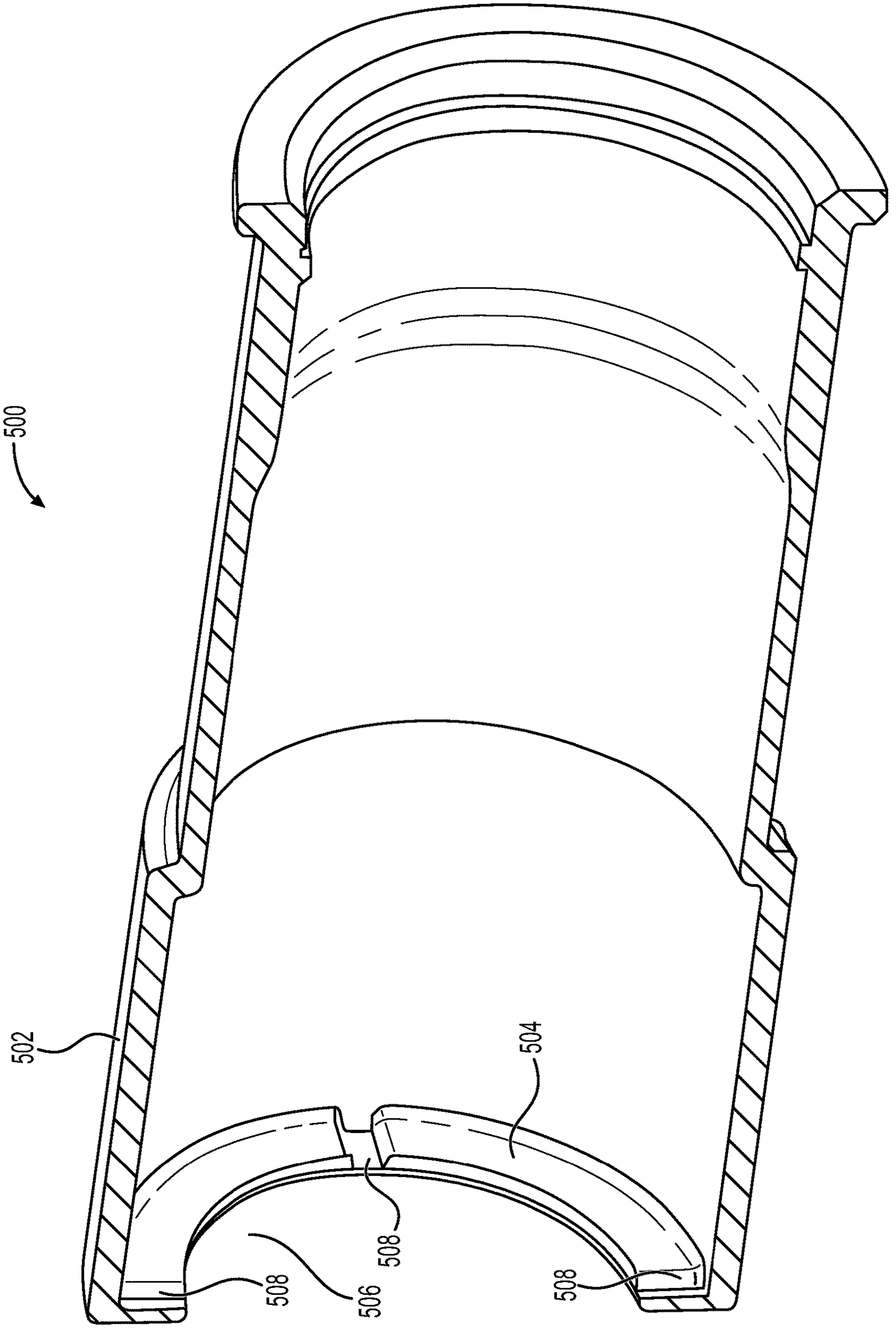
FIG. 12 is a sectional view of the boot of FIG. 11 taken along a plane containing its longitudinal axis.
Figure 13:
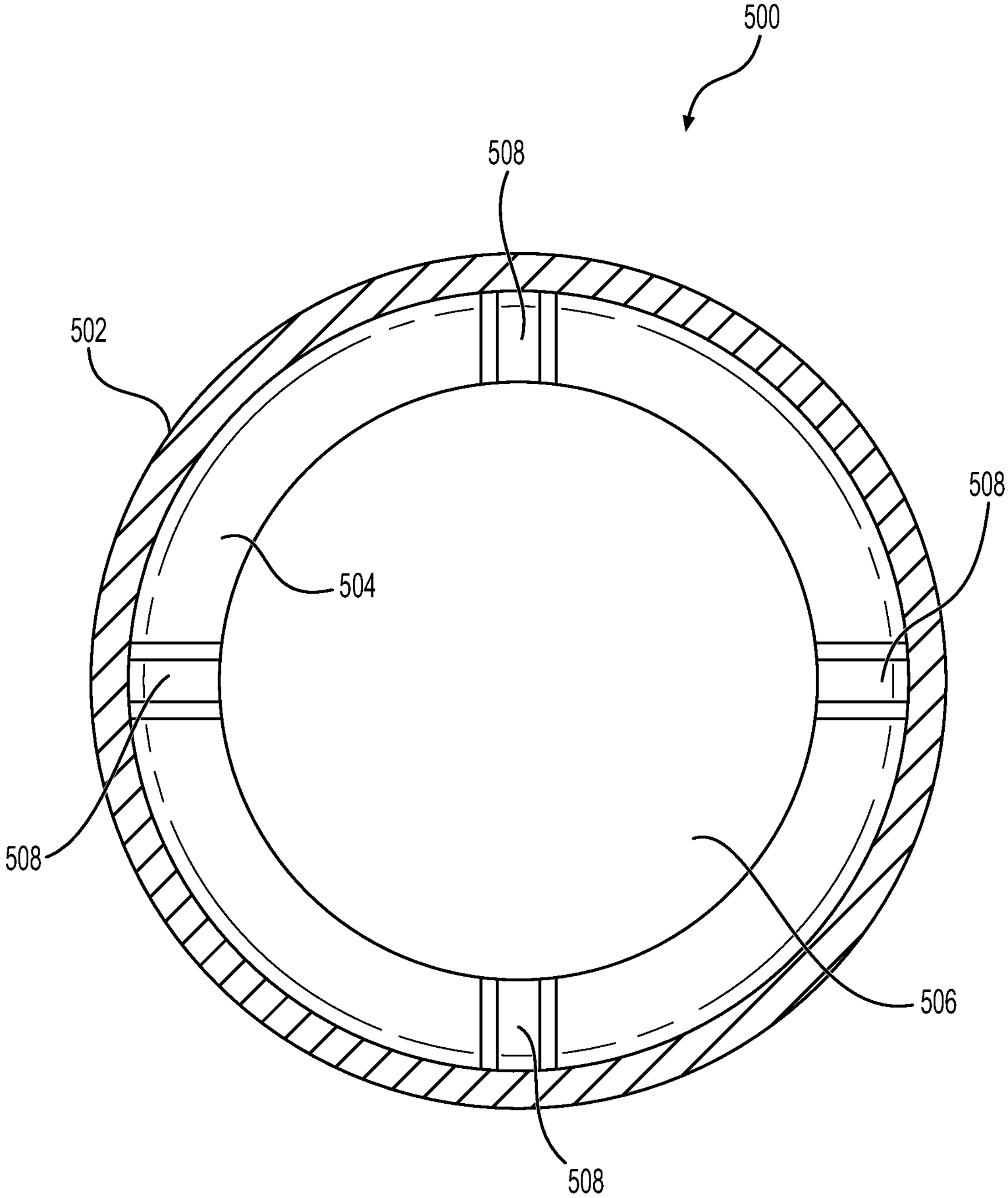
FIG. 13 is a sectional view of the boot of FIG. 11 taken along a plane that is perpendicular to its longitudinal axis

Focusing on FIGS. 8 and 9, the boot 300 may have an annular body (e.g., may be cylindrical, conical, elliptical, polygonal, etc.) defining a thru-bore with 310 a bore diameter D310, and a bore axis A310. Also, the annular body may define an overall axial length 310, an exterior 312, a first axial end 314, and a second axial end 316. The aperture 302 previously discussed herein for receiving the electrical connector of the fuel injection may extend from the thru-bore 310 to the exterior 312.

In some embodiments, a ratio of the overall axial length L310 to the bore diameter D310 may range from 1.46 to 2.11. Using this ratio, the design may be scaled up or down for a particular application.

Also, the aperture 302 may define a rectangular perimeter 318 that matches the perimeter of the electrical connector. Other shapes are possible. Also, the annular body may define a slit 320 that axially extends from the aperture 302 toward the first axial end 314 or the second axial end 316 (e.g., all the way to the second axial end as shown). This may allow the boot to slide left or right as shown in FIG. 7 past the electrical connector without having to disconnect the current supply wires (not shown). This slit may be omitted in other embodiments of the present disclosure. If omitted, it may be necessary to unplug the current supply wires before sliding the boot over the conduit and the fuel injector.

Furthermore, the annular body of the boot 300 may include a first axial end flange 322 extending radially outwardly from the exterior 312 as well as a second axial end flange 324. A first clamp member receiving groove 326 may be disposed axially proximate to the first axial end flange 322 while a second clamp member receiving groove 330 may be disposed axially proximate to the second axial end flange 324. The aperture 302 may be disposed axially nearer one axial end (e.g., the second axial end 316) than the other, or vice versa, or same distance.

Figure 6:
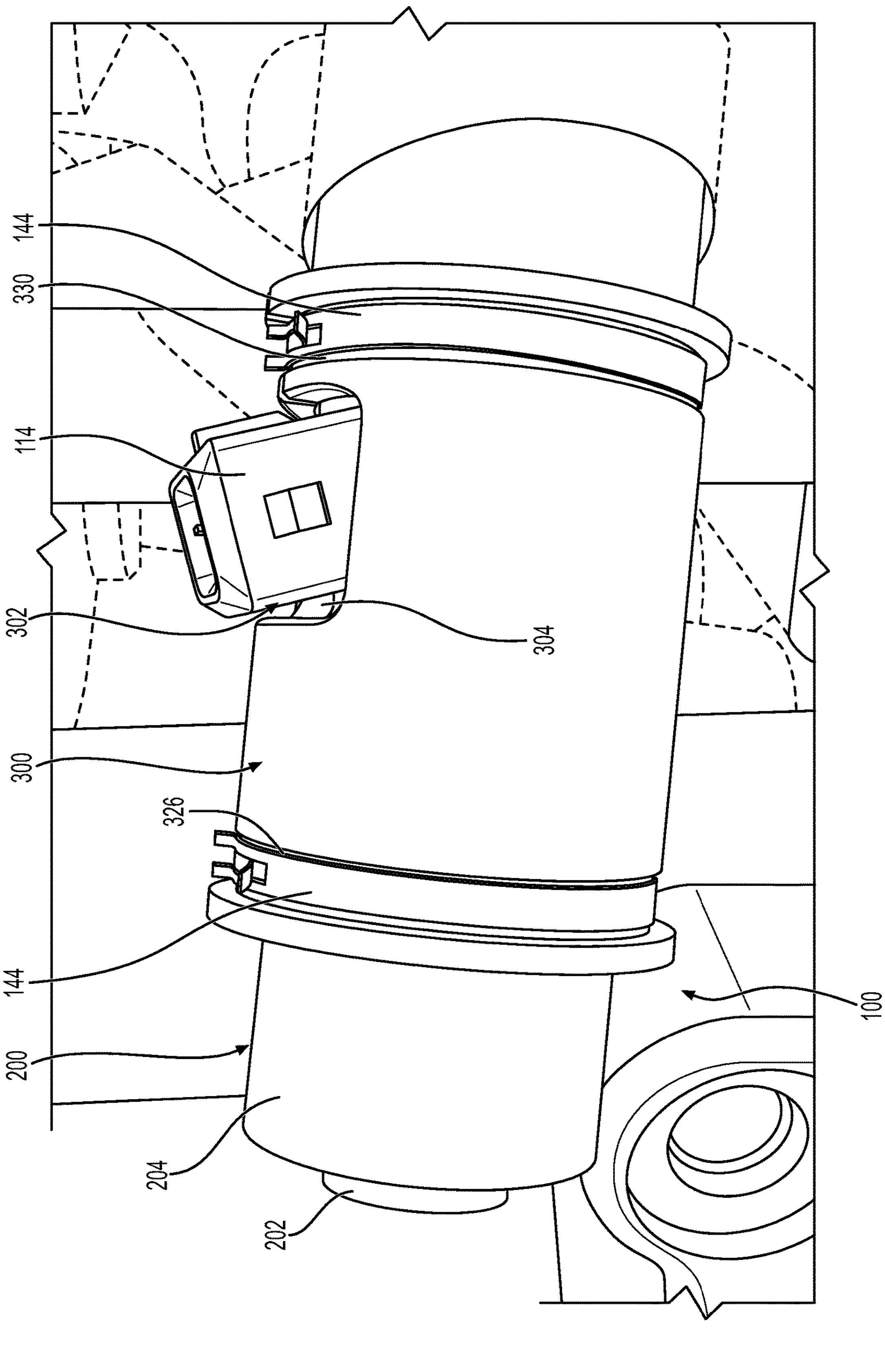
FIG. 6 is an alternate view of the boot and fuel injector of FIG. 5 with clamp members holding the boot onto the fuel injector and the double walled conduit shown.

As seen in FIG. 6, clamp members 144 such as spring clamps as shown, and/or hose clamps, zip ties, cable ties, barb ties, rubber bands, etc. may be employed to help keep the boot from moving. However, these grooves, and clamp members may be omitted in other embodiments of the present disclosure such as when the elastic or shrinking force of the boot is sufficient to keep the boot in place. When employed as shown in FIG. 9, these grooves and the inner ribs may be radially and axially adjacent to each other so that compression force provided by the clamp members helps keep the ribs in the grooves of the outer conduit and the fuel injector.

The annular body of the boot may be flexible comprising at least one of the following: an elastomeric material, a rubber material, a bellows configuration, a plastic, and a mesh. The flexibility may allow the boot or sleeve to compress onto the fuel injector and the conduit for form liquid tight seals. In any application, the material of the boot may be chemically compatible with the fuel being used. In a particular embodiment, the boot may comprise an ethylene propylene diene monomer (EPDM) rubber. EPDM is chemically compatible with methanol. Other materials are possible in other embodiments of the present disclosure.

Another embodiment of the boot is depicted in FIGS. 10 thru 13. It is to be understood that this boot 500 is similarly constructed and configured as boot 300 except for some of the following differences.

The front of the boot 500 lacks a flange. Instead, the front of the boot includes an increased diameter portion 502 as compared to boot 300 that allows the boot to wrap around the fuel injector more completely. As a result, the boot 500 may employ a radially inner extending wall or shoulder 504 that defines a fuel injector receiving aperture 506 that allows the nozzle portion of the fuel injector to pass through it. The contact of the shoulder 504 on the fuel injector helps to limit rearward movement of the boot.

The boot 500 is shown to be disposed in the counterbore of the cylinder head unlike the previous embodiment discussed herein. During assembly, the boot 500 may be placed onto the fuel injector which is then inserted into the counterbore. Then, the double walled conduit may be inserted over the rear of the fuel injector while the rear of the boot is pushed forward. Then, the rear of the boot may be pulled back over the double walled conduit to achieve the arrangement shown in FIG. 10.

In operation, this boot works much that same as the earlier embodiment. Additional air passage(s) 508 may be defined by the shoulder that extend radially from the fuel injector receiving aperture 506 to the interior of the boot. Any leaks near the front of the fuel injector may pass through these passages allowing their detection. These passages may be omitted in other embodiments of the present disclosure.

Figure 14:
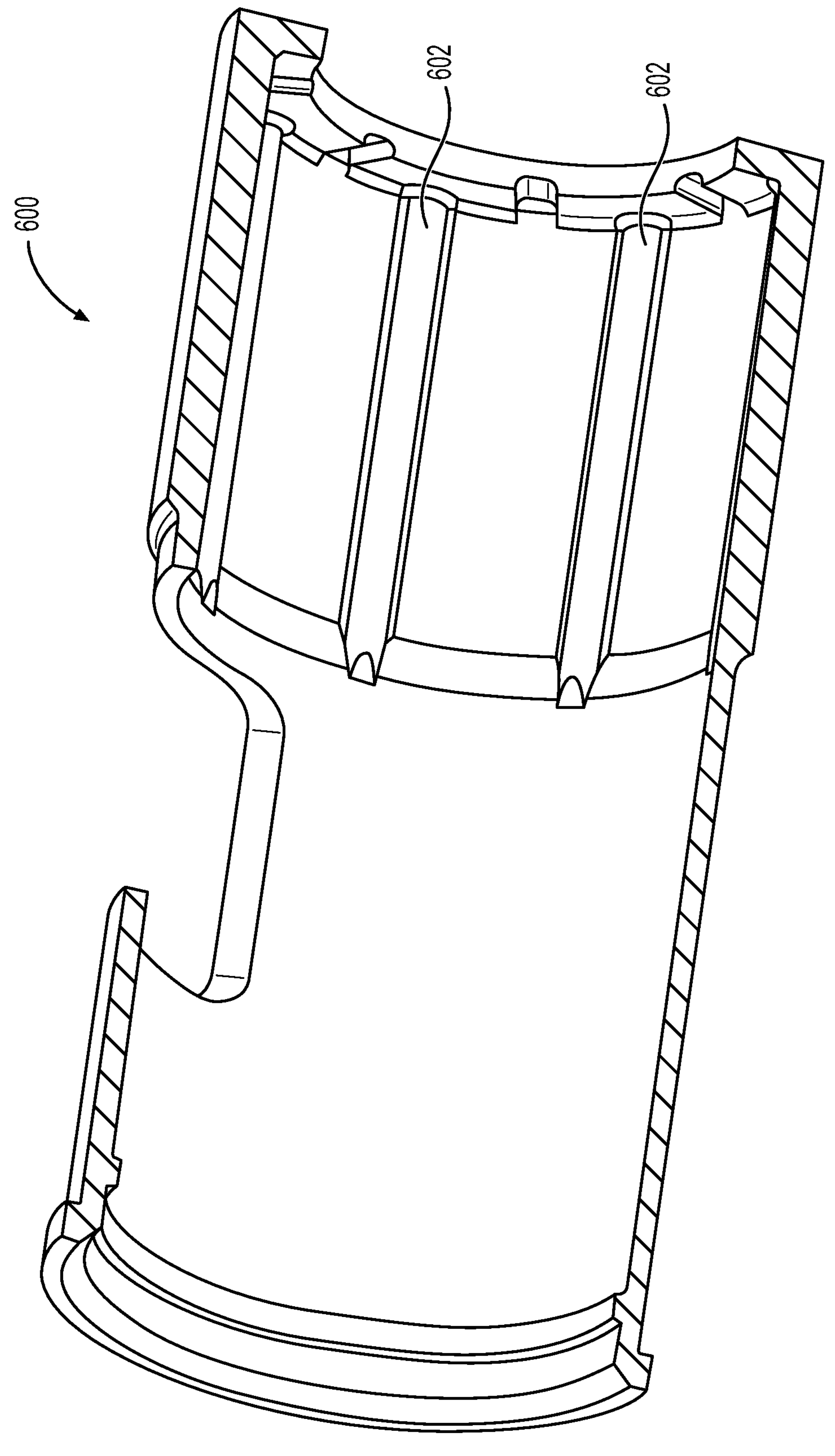
FIG. 14 is a sectional view of another embodiment of the present disclosure that is similarly or identically configured as the other embodiments discussed herein FIG. 15 contains a flowchart that depicts a method of assembling the boot onto a fuel injector and a double walled conduit according to an embodiment of the present disclosure.

Another boot 600 is shown in FIG. 14, which is similarly or identically configured as boot 500. However, a plurality of flutes 602 are employed to ensure a travel passage from the air passages 508 described previously for boot 500. These flutes 602 may extend axially rearwardly from the shoulder 504.

INDUSTRIAL APPLICABILITY

In practice, a fuel injector, a boot or sleeve, a double walled conduit, and/or the outer conduit according to any embodiment described herein may be provided, sold, manufactured, and bought etc. as needed or desired in an aftermarket or OEM (original equipment manufacturer) context. For example, the boot or the outer conduit may be used to retrofit an existing engine already in the field or may be sold with an engine or a piece of equipment using that engine at the first point of sale of the piece of equipment.

While a methanol operated engine has been described herein, it is to be understood that the embodiments described herein may also be used with other types of fuel.

The configuration, ratios and dimensional ranges of any of the features of any of the embodiments discussed herein may be altered to be different than what has been explicitly discussed or shown depending on the application.

The boot may be fabricated using an injection molding process, machined, etc. The double walled conduit may be extruded, co-extruded, etc. with an enlarged end for the fuel supply line added later that provides a counterbore for receiving the fuel inlet of the fuel injector, etc. Though not shown, it is contemplated that ribs may connect the two walls of the double walled conduit to facilitate coextrusion and to keep the walls separated consistently, etc.

Since various components are at least partially round, it can be readily understood by one skilled in the art that most, almost all, or all of the finished geometry of these components may not vary, or may not vary significantly, along the circumferential direction about their longitudinal axis.

Figure 15:
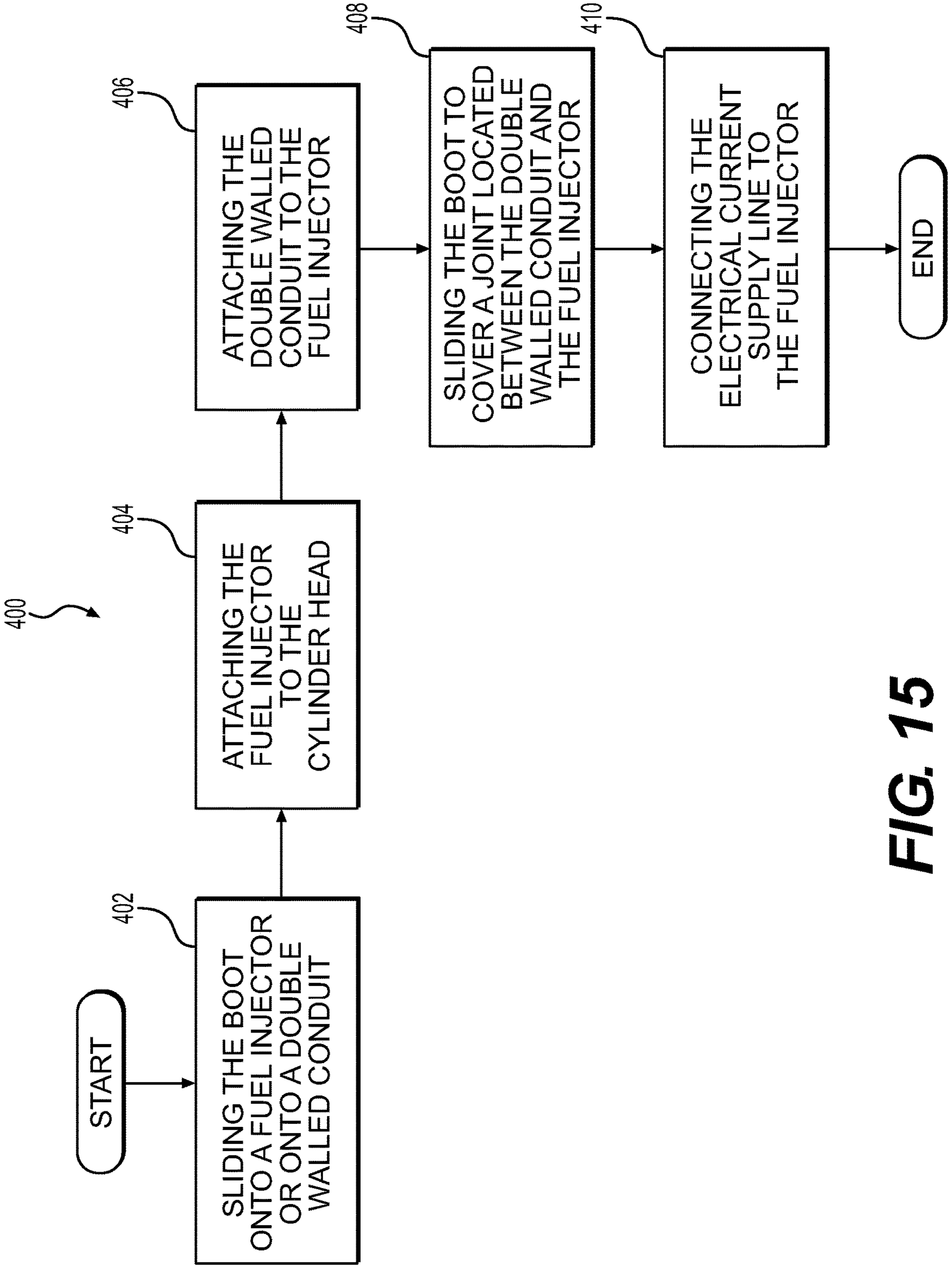

FIG. 15 depicts a method 400 of assembling the boot onto a fuel injector and a double walled conduit according to an embodiment of the present disclosure. The method may comprise first sliding the boot onto the fuel injector or onto the double walled conduit (step 402). For example, the boot may be slid onto one end of the fuel injector before the fuel injector has been inserted into the cylinder head. Or, the boot may be slide onto the other end of the fuel injector. The boot may be slid over the double walled conduit away from its free end. This allows the boot to be stowed on the conduit when the fuel injector is being replaced or serviced.

Step 404 involves attaching the fuel injector to the cylinder head. This may occur before or after step 402. Step 406 involves attaching the conduit to the fuel injector. This may before or after steps 402 and 404. Next, the boot is slid to cover a joint located between the conduit and the fuel injector (step 408). In some cases, the electrical current supply line of the engine are connected (step 410) after step 408.

In operation, once the boot has been properly installed, it allows any fuel leakage at the joint between the inner fuel supply line 202 and the fuel injector 102 to be conducted via the annular air channel 206 in the form of gas or a liquid and drawn away via vacuum pressure to detectors found in the stacks of the ship or other marine vessel that extend vertically upwardly from the fuel pump room that is under vacuum pressure. It is this vacuum pressure that draws the fuel from the proximate the boot to the sensors. If the sensors detect fuel, then the engine and/or the fuel pump may be shut off for safety reasons.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A fuel injector, a cylinder head, and a fuel supply interface comprising:

a fuel injector having an at least partially annular body defining a longitudinal axis, and a radial direction, and including
- a fuel inlet;
- an injection outlet;
- an electrical connector;

a doubled walled conduit attached to the fuel injector; and a boot disposed about the at least partially annular body of the fuel injector and the doubled walled conduit, the boot including
- an annular body defining
  - a thru-bore with a bore diameter, and a bore axis;
  - an overall axial length;
  - an exterior;
  - a first axial end, and a second axial end; and
  - an aperture extending radially from the thru-bore to the exterior.

2. The fuel injector, the cylinder head, and the fuel supply interface of claim 1, wherein the doubled walled conduit includes an inner fuel supply line that is connected to the fuel inlet of the fuel injector, and an outer conduit that defines an annular air channel between the inner fuel supply line and the outer conduit.

3. The fuel injector, the cylinder head, and the fuel supply interface of claim 2, wherein the boot is disposed about the outer conduit and the electrical connector of the fuel injector extends through the aperture of the boot.

4. The fuel injector, the cylinder head, and the fuel supply interface of claim 3, wherein an air gap is defined between a perimeter of the aperture of the boot and the electrical connector of the fuel injector that is in fluid communication with the annular air channel.

5. The fuel injector, the cylinder head, and the fuel supply interface of claim 4, wherein the at least partially annular body of the fuel injector includes a first diameter portion disposed axially between the electrical connector and the injection outlet, and b the at least partially annular body of the fuel injector includes a second diameter portion thatthM is disposed axially between the fuel inlet and the electrical connector.

6. The fuel injector, the cylinder head, and the fuel supply interface of claim 5, wherein the first diameter portion defines a first diameter, and the second diameter portion defines a second diameter that is different than the first diameter.

7. The fuel injector, the cylinder head, and the fuel supply interface of claim 6, wherein the first diameter is greater than the second diameter, providing an air void that connects the annular air channel to the air gap.

8. The fuel injector, the cylinder head, and the fuel supply interface of claim 7, wherein the fuel injector is an EV14 type fuel injector.

9. The fuel injector, the cylinder head, and the fuel supply interface of claim 7, wherein the fuel injector further comprises a rail O-ring seal that is disposed radially and axially proximate to the fuel inlet, a fuel filter that is disposed axially between the fuel inlet and the injection outlet, a coil that is disposed radially inwardly from the first diameter portion and that is in electrical communication with the electrical connector, and an armature that is disposed axially between the coil and the injection outlet.

10. The fuel injector, the cylinder head, and the fuel supply interface of claim 9, wherein the fuel injector further comprises a spring that is disposed radially inwardly of the coil and axially contacts the armature, a cylinder head O-ring seal that is disposed radially and axially proximate to the injection outlet that is defined by an injection nozzle member, and a shutoff stem disposed radially inwardly from the cylinder head O-ring seal, and in a bore of the injection nozzle member, the shutoff stem being configured to shut off the injection outlet.

11. A boot comprising:

an at least partially cylindrical or conical annular body defining a thru-bore with a bore diameter, and a bore axis;

an overall axial length;

an exterior;

a first axial end, and a second axial end;

an aperture extending radially from the thru-bore to the exterior, the aperture defining a rectangular perimeter;

a first axial end flange;

a second axial end flange;

a first clamp member receiving groove that is disposed axially proximate to the first axial end flange; and a second clamp member receiving groove that is disposed axially proximate to the second axial end flange.

12. The boot of claim 11, wherein a ratio of the overall axial length to the bore diameter ranges from 1.46 to 2.11.

13. The boot of claim 11, wherein the annular body is flexible comprising at least one of the following: an elastomeric material, a rubber material, a bellows configuration, a plastic, and a mesh.

14. The boot of claim 11, wherein the annular body comprises an ethylene propylene diene monomer rubber.

15. A boot comprising:

an at least partially cylindrical or conical annular body defining a thru-bore with a bore diameter, and a bore axis;

an overall axial length;

an exterior;

a first axial end, and a second axial end;

an aperture extending radially from the thru-bore to the exterior;

an increased diameter portion with a shoulder defining a fuel injector receiving aperture; and wherein the shoulder defines one or more air passages that extend radially to the fuel injector receiving aperture.

16. The boot of claim 15, wherein the boot defines one or more flutes that extend axially from the shoulder.

* * * * *